United States Patent
Mobin et al.

(10) Patent No.: US 6,522,696 B1
(45) Date of Patent: Feb. 18, 2003

(54) ADAPTIVE FREQUENCY CORRECTION IN A WIRELESS COMMUNICATIONS SYSTEM, SUCH AS FOR GSM AND IS54

(75) Inventors: Mohammad Shafiul Mobin, Whitehall, PA (US); Kalyan Mondal, Berkeley Heights, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 08/832,719

(22) Filed: Apr. 11, 1997

(51) Int. Cl.$^7$ ................................................. H04L 5/12
(52) U.S. Cl. ...................... 375/262; 375/326; 375/344; 375/371
(58) Field of Search ................................ 375/262, 326, 375/327, 344, 346, 371, 373

(56) References Cited

U.S. PATENT DOCUMENTS

| | | | | |
|---|---|---|---|---|
| 5,233,633 A | * | 8/1993 | Baum et al. | 375/97 |
| 5,311,545 A | * | 5/1994 | Critchlow | 375/14 |
| 5,400,366 A | * | 3/1995 | Iwamatsu | 375/97 |
| 5,440,589 A | * | 8/1995 | Kaku et al. | 375/344 |
| 5,465,275 A | | 11/1995 | Blaker et al. | 375/341 |
| 5,557,639 A | * | 9/1996 | Heikkila et al. | 375/224 |
| 5,592,514 A | | 1/1997 | Mobin | 375/336 |
| 5,699,385 A | * | 12/1997 | D'Sylva et al. | 375/344 |
| 5,732,113 A | * | 3/1998 | Schmidl et al. | 375/355 |
| 5,748,682 A | * | 5/1998 | Mobin | 375/344 |

OTHER PUBLICATIONS

"Mobile Radio Communications" Raymond Steele, Pentech Press Limited, 1992.

* cited by examiner

Primary Examiner—Stephen Chin
Assistant Examiner—Mohammad Ghayour

(57) ABSTRACT

In accordance with one embodiment of the invention, a method for compensating frequency offset errors in a communication system comprising the steps of receiving a plurality of signal bursts that correspond to a plurality of transmitted signal bursts. A channel estimation is performed based on at least the predetermined information contained in the transmitted signal bursts. For each received signal sample, a Viterbi decoding is performed using the channel estimations. A final updated Viterbi state cost is calculated for each received signal. A good equalizer quality signal is provided when the final updated Viterbi state cost is below a given threshold. The transmitted signal bursts are then reconstructed from the receive signal bursts, by applying the channel estimation to reencode the decoded signal bursts retrieved from the Viterbi decoder. The quality of the channel estimation is determined based on a given threshold of bit error rate in a plurality of received signal bursts. The frequency offset error is updated in accordance with the reconstructed transmitted signals, when the quality of the channel is such that the bit error rate in the received signal bursts is below the given threshold and, when the good equalizer quality signal is provided. Each received signal is adjusted in accordance with the updated frequency offset error.

19 Claims, 7 Drawing Sheets

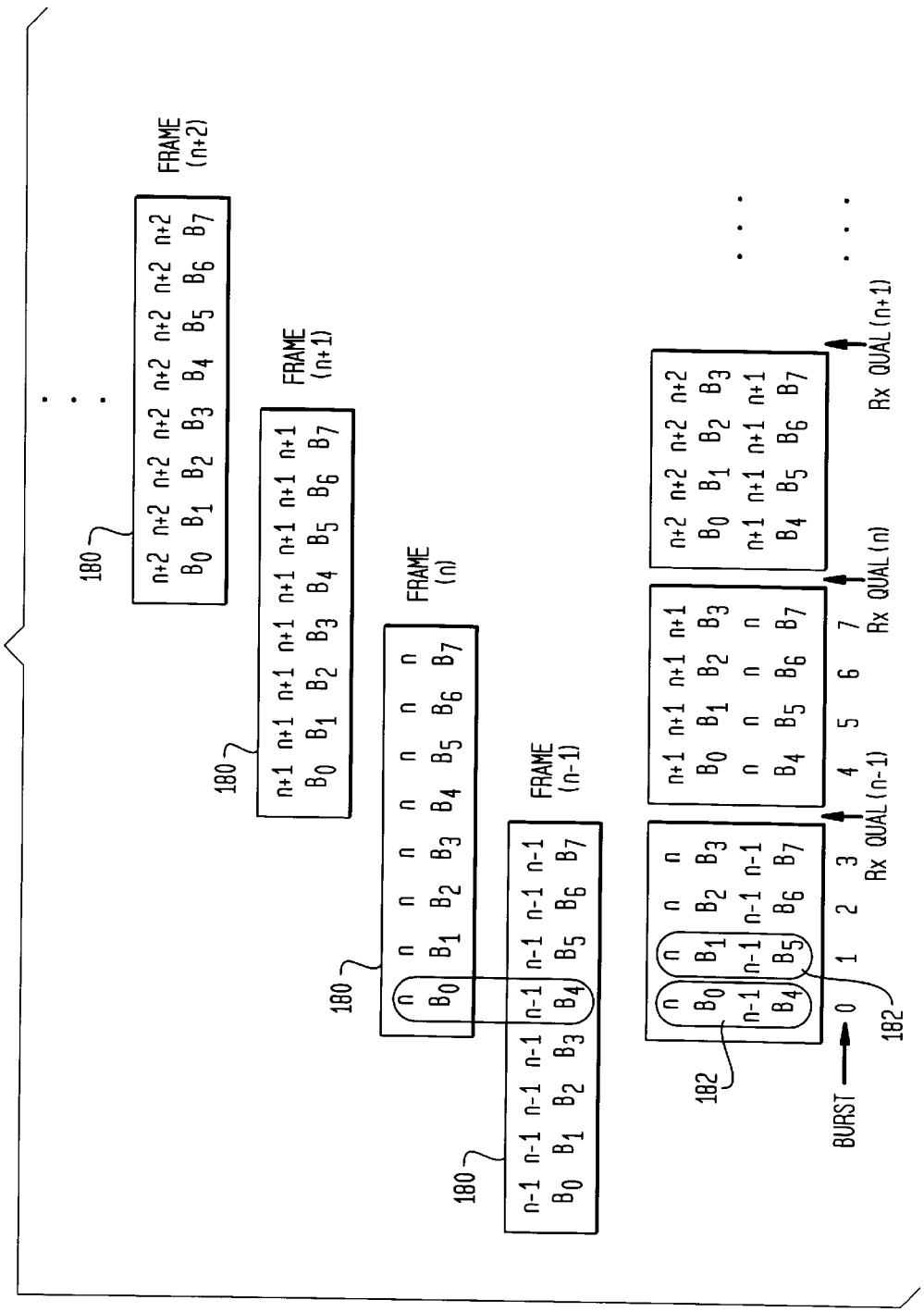

FIG. 7

| | LABEL | OPERATION | COMMENT |
|---|---|---|---|
| 200 | Stabilize_Constellation: | AFC_F_rotor=AFC_F_synch | INITIALIZE THE CONSTELLATION ROTATING FREQUENCY OFFSET TO AFC_F_synch AND THEN START TRACKING AFC_F_rotor |
| 202 | Reference_Initialization: | AFC_F_ref=0, Count=0 | INITIALIZE REFERENCE FREQUENCY OFFSET TO ZERO AND SET ACCUMULATION COUNT TO ZERO |
| 204 | Accumulation_Initialization_One: | AFC_F_acc=0 | INITIALIZE ACCUMULATED RESIDUAL FREQUENCY OFFSET TO ZERO |
| 206 | Accumulate_Residual_Frequency_Offset_One: | Variable_1=sum(AFC_F_res(I)), I=n, n+1, n+2, n+3 | ACCUMULATE RESIDUAL FREQUENCY OFFSET TO ZERO |
| 208 | RXQUAL_Qualification_One: | IF (RXQUAL==good) {AFC_F_acc+=Variable_1; Count+=4;} | ACCUMULATE RESIDUAL FREQUENCY OFFSET ONLY IF QUALIFIED BY THE RXQUAL FLAG AND UPDATE COUNT |
| 210 | Branch_Select_One: | IF (Count<4*N1) GO TO Accumulation_Initialization_One | CONTINUE RESIDUAL FREQUENCY ACCUMULATION IF 4*N1 ACCUMULATION IS NOT DONE |
| 212 | Tracking_Initialization: | Count=0, AFC_F_ref= AFC_F_acc/(4*N) | GET REFERENCE FREQUENCY OFFSET AND SET COUNT TO ZERO |
| 214 | Accumulation_Initialization_Two: | AFC_F_acc=0 | INITIALIZE ACCUMULATED RESIDUAL FREQUENCY OFFSET TO ZERO |
| 216 | Accumulate_Residual_Frequency_Offset_Two: | IF (abs(AFC_F_ref-AFC_F_res)< THRESHOLD_ONE and BURST_QUAL<THRESHOLD_TWO) Variable_1=sum(AFC_F_res(I)), I=n, n+1, n+2, n+3 | ACCUMULATE RESIDUAL FREQUENCY OFFSET OVER FOUR BURSTS IF THE ACCUMULATED COST OF THE LAST SURVIVOR IS BELOW A THRESHOLD AND RESIDUAL FREQUENCY DISTANCE FROM THE REFERENCE IS BELOW THRESHOLD |
| 218 | RXQUAL_Qualification_Two: | IF (RXQUAL==good) {AFC_F_acc+=Variable_1; Count+=4;} | ACCUMULATE RESIDUAL FREQUENCY OFFSET ONLY IF QUALIFIED BY THE RXQUAL FLAG AND UPDATE COUNT |
| 220 | Branch_Select_Two: | IF (Count<4*N2) GO TO Accumulation_Initialization_Two | CONTINUE RESIDUAL FREQUENCY ACCUMULATION IF 4*N2 ACCUMULATION IS NOT DONE |
| 222 | Update_Rotor_Frequency: | AFC_F_rotor=AFC_F_rotor+ AFC_F_acc/(4*N2) | CONSTELLATION ROTATION FREQUENCY OFFSET IS UPDATED |
| 224 | Continue | IF (AFC enable/disable==disable) go to IDLE else go to (Reference_Initialization) | CONTINUE AFC TRACKING IF AFC ENABLE IS ENABLED ELSE GO TO IDLE |
| 226 | IDLE: | IF (AFC enable/disable==enable) go to (Reference_Initialization) else AFC_F_acc=0; Count=0; | INITIALIZE ACCUMULATED RESIDUAL FREQUENCY OFFSET TO ZERO |
| 228 | Accumulate_Residual_Frequency_Three: | Variable_1=sum(AFC_F_res(I), I=n, ..., n+3 | CONTINUE AFC TRACKING IF AFC ENABLES ELSE STAY IN IDLE |
| 230 | RXQUAL_Qualification_Three: | IF (RXQUAL==good) {AFC_F_acc+=Variable_1; Count+=4;} | ACCUMULATE RESIDUAL FREQUENCY OFFSET ONLY IF QUALIFIED BY THE RXQUAL FLAG AND UPDATE COUNT |
| 232 | Branch_Select_Three: | IF (count<4*N3) go to Accumulate_Residual_Frequency_Three else go to IDLE | IDLE MODE RESIDUAL FREQUENCY ACCUMULATION. EXECUTIVE WILL USE THIS QUANTITY TO DECIDE WHETHER AFC TRACKING MODE WILL BE RESTARTED OR NOT |

ADAPTIVE FREQUENCY CORRECTION IN A WIRELESS COMMUNICATIONS SYSTEM, SUCH AS FOR GSM AND IS54

TECHNICAL FIELD

The present invention relates to communication systems, and more specifically to frequency error correction in a communication system.

BACKGROUND OF THE INVENTION

In a conventional radio communication system, a transmitter sends information over a high frequency channel. Typically, a radio frequency upconverter converts a baseband signal to a high frequency signal prior to its transmission. A baseband signal can be upconverted in frequency by a multiplication process. This signal is mixed by the output signal of a local crystal oscillator that is tuned to a modulating frequency. The output signal of the mixer is the baseband signal shifted in frequency by an amount corresponding to the modulating frequency of the local crystal oscillator. A receiver receiving the transmitted signal first down converts the signal by shifting it back to a baseband frequency range. A local oscillator tuned to the modulating frequency is multiplied by the transmitted signal.

A cellular communication system is one type of radio communication system mentioned above, in which radio telephones contain circuitry to permit transmission and reception of modulated signals. The radio telephones, known as mobile stations, engage in a two-way communication with remotely located transceivers, known as base stations. These radio telephones also have a local crystal oscillator for down converting into baseband range, the signals that the base station transmits.

One problem with the radio communication arrangement described above is that the crystal oscillator frequency at the receiving station may not be exactly the same as the modulating frequency at the transmitter. This frequency offset between the transmitter and the receiver stations may cause communication errors. One of the possible reasons for this frequency offset is that the output frequency signal of the local oscillator may drift away from the intended modulating frequency over a period of time due to, for example, the ambient temperature variations at the receiver. Another possible reason for this frequency offset may be relative motion between a base and a mobile station. As it is well known, such relative motion between a transmitting and a receiving station, may result in a Doppler shift of the frequency of the signal being transmitted. This Doppler shift may therefore result in a phase/frequency error in the received signal, for example. Because of the ambient temperature variations at the receiving station and the Doppler shift described herein, for example, the integrity of the signal being transmitted may be corrupted at the receiving end of the communications system.

A need therefore exists for an adaptive frequency correction system that is able to acquire and track the relative frequency error between a mobile station and a base station.

SUMMARY OF THE INVENTION

In accordance with one embodiment of the invention, a method for reducing frequency offset errors in a communications system comprises the steps of receiving a plurality of signal bursts; correcting the frequency error with the coarse frequency error estimate; decoding the received signal bursts by employing an equalizer, that generates a burst quality indication signal corresponding to the bit error rate in each received signal sample; generating a plurality of residual frequency offset signals corresponding to each signal burst; channel decoding said signal bursts generated by said equalizer so as to generate a channel quality signal repeating the bit error rate over a plurality of burst signals; accumulating residual frequency offset signals corresponding to bursts having acceptable burst quality indication signals and channel quality indication signals; acquiring a rotation frequency offset signal based on the accumulated residual frequency offset signals; and adjusting the phase of the received signal samples in accordance with the rotation frequency offset signal.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects and advantages thereof may best be understood by reference to the following detailed description when read with the accompanying drawings in which:

FIG. 4 is a block diagram illustrating signal organization in accordance with one embodiment of the present invention.

FIG. 7 is a flowchart illustrating the operation of the embodiment of the present invention described with reference to FIGS. 1a and 1b.

DETAILED DESCRIPTION OF THE DRAWINGS

One embodiment of the present invention is described with reference to a digital cellular telephone system. However, it will be appreciated that the present invention may be implemented in a variety of communication systems, and therefore, is not limited in scope in this respect.

Several approaches are being employed with respect to signaling standards for digital cellular telephone worldwide. One such standard is Europe's global system for mobile communications (GSM), described in ETSI/GSM Series 03 Air Interference Specification, OSM PN Paris, herein incorporated by reference. One aspect of the standard involves the transmission of signals in the form of signal bursts.

Figure 2:
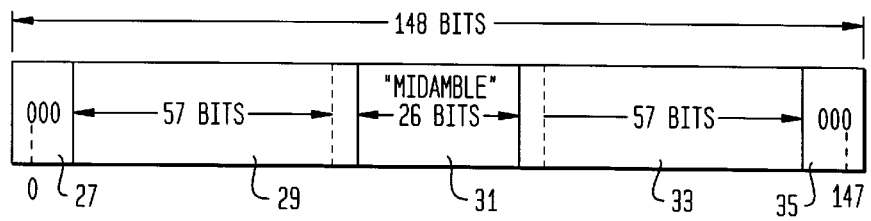
FIG. 2 is a diagram illustrating a signal or transmission burst, such as for GSM.

FIG. 2 illustrates a signal burst also known as a transmission burst or a signal frame, such as may be employed in a wireless communication system, although the invention is not limited in scope to a signal burst having this particular form or format. In the present context, the terms signal burst, transmission burst or signal frame may be used interchangeably. The signal or transmission burst illustrated in FIG. 2 has a predetermined number of digital signals or bits. In this particular embodiment, each burst includes, in succession, a series of successive predetermined starting bits 27, a predetermined number of information bits 29, a series of predetermined training bits 31, a second predetermined number of information bits 33, and a series of successive predetermined ending bits 35. In GSM systems, for example, there are three starting and three ending bits, 57 bits in both portions of the signal burst comprising binary digital signals to be transmitted, and 26 training bits, referred to as the "midamble," for a total of 148 bits per signal burst. The training bits are known at both the receiving and the transmitting end of the communications system. The starting and ending bits are likewise known and are typically "zeros." It will be appreciated that other numbers and distribution of bits are possible depending on the implementation.

The GSM telecommunication standard requires a form of signal modulation in the baseband known as Gaussian Minimum Phase Shift Keying (GMSK). GMSK is described in more detail in *Digital Phase Modulation*, by J. B. Anderson, T. Aulin and C. E. Sundburg, 1986, available from Plenum, although, of course the invention is not limited in scope to GMSK modulation schemes. In a GSM/GMSK transmitter, the input bit or binary digital signal stream 20 is differentially encoded, e.g. baseband modulated, to produce a positive or negative 90° phase shift representing one or more binary digital signals in the signal burst being transmitted. This phase shift modulated baseband signal may then be applied to a radio frequency (RF) carrier for transmission. At the receiving end, after down conversion and signal sampling, the binary digital signals in the signal burst are processed by a process referred to as "derotation." This process is applied to each signal sample in the signal burst.

Figure 3:
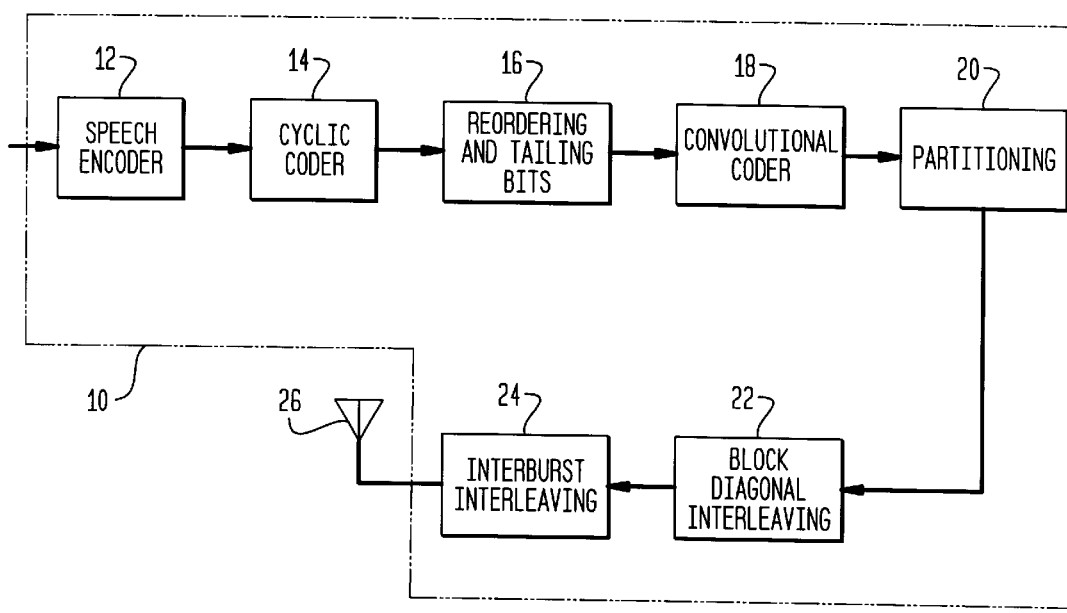
FIG. 3 illustrates a signal processor employed in a transmitter for transmitting signals, in accordance with one embodiment of the invention.

FIG. 3 illustrates a signal processor 10 employed in a transmitter for transmitting signals in accordance with GSM communications standard mentioned above. The signal processing scheme employed by signal processor 10 is well known and described in Mobile *Radio Communications* by Raymond Steele (Pentech Press Limited, 1992), and incorporated herein by reference. Basically, signal processor 10 includes a speech encoder 12 configured to encode speech signals for transmission in accordance with GSM standard. Speech encoder 12 delivers signal frames of 260 bits of data for each 20 ms of speech duration at a bit rate of 13 kbits/s. The output signal frames of speech encoder 12 are coupled to the input terminal of a cyclic coder 14, which applies a cyclic code to each signal frame received from speech encoder 12. The first 50 bits of each received frame are encoded by an error detecting block code. Thus, cyclic coder 14 generates three parity bits in response to the first 50 bits of the received frame. These parity bits are added to the received frame bringing the total number of bits in each frame to 263 bits. The output signal of cyclic coder 14 is coupled to an input terminal of a reordering and tailing bit circuit 16. At this stage the first 182 bits of signal frames delivered by speech encoder 12 are reordered, such that bits with even indices are collected in the first part of a new data word, followed by the three parity bits generated by cyclic coder 14, followed by bits with odd indices, followed by four zero tailing bits, followed by the remaining 78 encoded bits. This brings the length of each signal frame to 267 bits.

The signal frame generated by reordering and tailing bits circuit 16 is then coupled to an input terminal of a convolutional coder 18. Convolutional coder 18 has a constraint length K=5 and a rate=½. At this stage the first 189 bits of signal frame received by convolutional coder may be encoded in accordance with known convolutional coding techniques as described in *Mobile Radio communications*, mentioned above. The total frame length after this convolutional coding amounts to 189(bits)*2+78=456 bits.

The 456 bits signal frame generated by convolutional coder 18 is then coupled to an input terminal of a partitioning circuit 20. The partitioning circuit partitions the received signal frames into eight 57 bits long sub-blocks. These 57 bits long sub-blocks are then fed to a block-diagonal interleaving circuit 22.

FIG. 4 illustrates the format of signal bursts processed by block-diagonal interleaving circuit 22. Circuit 22 processes the sub-block signals received from partitioning circuit 20. For example, each one of the frame numbers (n−1), n and (n+1), comprises eight sub-blocks block $B_0$ through $B_7$. Interleaving circuit 22 generates signal bursts 182 by combining sub-blocks $B_{4+K}$ from a previous frame, such as frame (n−1), with sub-blocks $B_K$ from the following frame, such as frame n, where K=0, 3. Thus, each signal burst is made of sub-blocks of two consecutive frames received from partitioning circuit 20.

The output signals of block-diagonal interleaving circuit 22 is coupled to an input terminal of an interburst interleaving circuit 24. Each signal burst is further interleaved by assigning the original received bits, c(n,k), into an interleaved sequence I(B, j) as stated below:

$I(B,j)=c(n,k)$ where k=0,1, . . . 455 is the bit index in the nth coded frame, and n=01,2, . . . is the frame index, and B=b+4n+[k mod 8] is the sub-block index with an initial value of b and $$j = \begin{matrix} 2\,[(49k)\,mod\,(57)] \ if \ [k \ mod \ 8] \le 3 \\ 2\,[(49k)\,mod\,(57)+1 \ if \ [k \ mod \ 8] \le 3 \end{matrix}$$

Signals generated after interburst interleaving are then transmitted, via an antenna 26, for reception by an intended receiver as will be explained in more detail hereinafter.

Figure 1A:
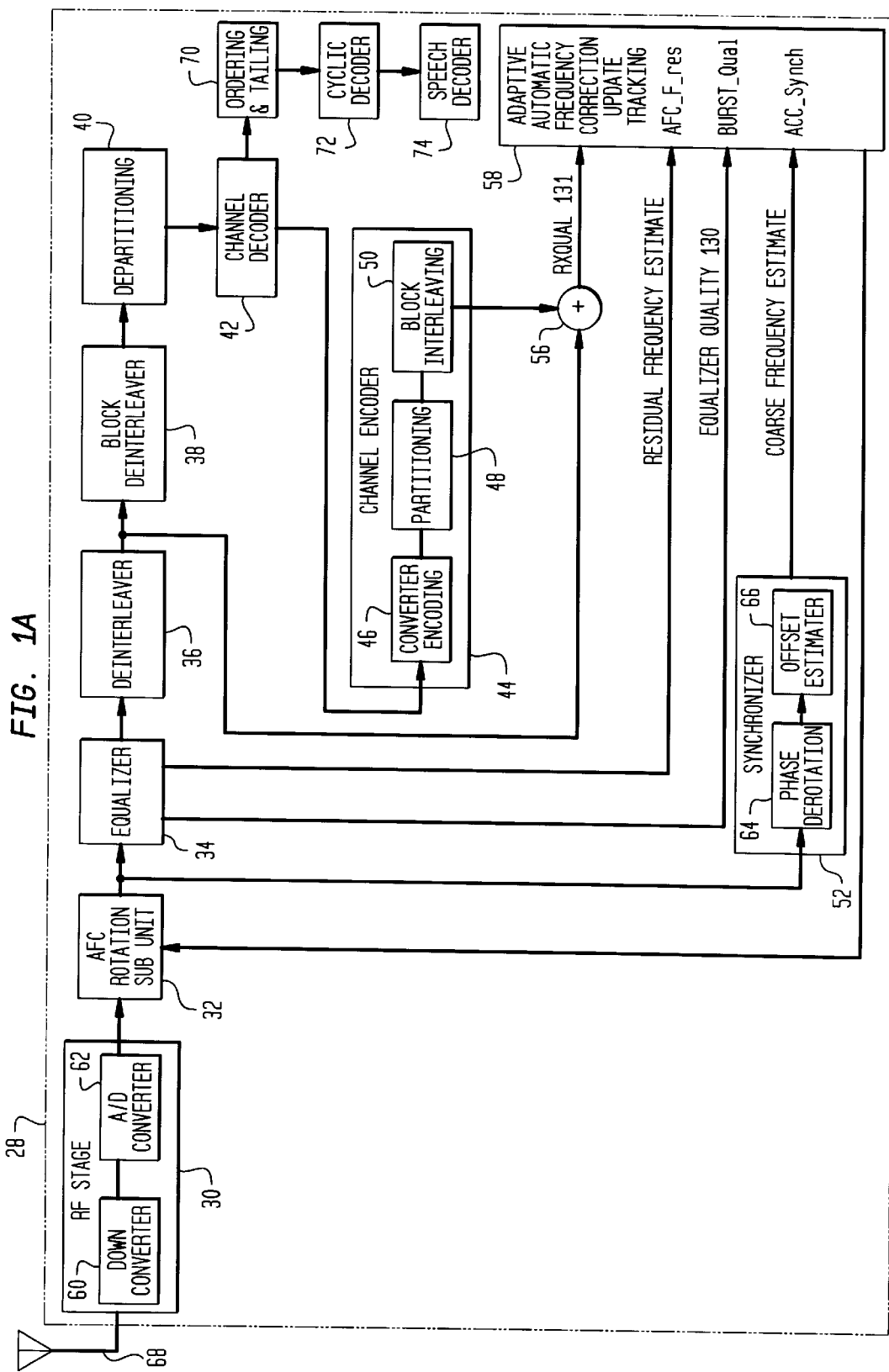
FIG. 1a is a block diagram illustrating one embodiment of a system employing adaptive frequency correction in accordance with the present invention.

FIG. 1a is a block diagram of a receiver 28 that employs one embodiment of an adaptive frequency correction unit in accordance with the invention, although the invention is not limited in scope to this receiver or the frequency correction unit illustrated herein. Receiver 28 may be used to receive signals transmitted by a transmitter employing signal processor 10 of FIG. 3.

Receiver 28 includes an antenna 68, which is configured to receive the transmitted signals. The output signals of antenna 68 is coupled to an input terminal of a radio frequency RF stage 30, which comprises a down converter 60, with an output terminal coupled to the input terminal of an analog to digital A/D converter 62.

The down converter includes a crystal oscillator that is approximately tuned to the modulating frequency of the transmitted signal. The output signal of the down converter is a baseband signal, which is fed into analog-to-digital converter 62 to produce baseband signal samples. This analog-to-digital (A/D) conversion may be performed, for example, by a baseband CODEC, which digitizes the baseband analog signal. An example of a down converter 60 and A/D converter 62 to perform such A/D conversion includes the W2020 GSM Transceiver and CSP1088 GSM Conversion Signal Processor, both available from Lucent Technologies Inc. or AT&T Corp., although the invention is not restricted in scope to the use of a baseband CODEC to perform the A/D conversion or to these particular devices. Furthermore, the invention is not limited in scope to an embodiment in which A/D conversion is performed so that binary signal processing may be employed. Likewise, the invention is not limited in scope to performing A/D conversion at this particular point in the signal path. For example, A/D conversion may be performed earlier in the signal path, such as before removal of the carrier frequency, or later in the signal path, depending on the particular embodiment.

The output terminal of analog to digital converter 62 is coupled to an adaptive frequency correction AFC rotation sub-unit 32. Another input terminal of AFC rotation sub-unit 32 is configured to receive a rotation frequency offset signal, AFC_F_rotor. This unit 32 rotates the phase of the incoming signals based on the rotation frequency offset signal, in order to reduce communication errors, as will be explained in more detail. Basically, this frequency offset signal is used to rotate the receiver signal to stabilize the rotating signal constellation. The corrected signals are then coupled to an input terminal of an equalizer 34 and an input terminal of a synchronizer 52. Equalizer 34 is employed to decode the signals received by receiver 28. One of the output terminals of equalizer 34 is coupled to an input terminal of a deinterleaver 36. Another output terminal of equalizer 34 provides a residual frequency offset signal, AFC_F_res, to an input terminal of automatic frequency correction unit 58, as will be explained below. The third output terminal of equalizer 34 is also coupled to an input terminal of an automatic frequency correction unit 58 to provide an equalizer quality, or burst quality signal, Burst_Qual. This burst quality signal represents the effectiveness of signal estimation accomplished by equalizer 34.

Synchronizer 52 comprises a phase derotator 64, and an offset estimator 66. Synchronizer 52 is used to provide an initial frequency estimate in response to a set of known signals transmitted by the transmitter at predetermined intervals, as will be explained in more detail hereinafter. An input terminal of phase derotator 64 is configured to receive signals from adaptive frequency correction, AFC, rotation sub unit 32. The output terminal of phase derotator 64 is coupled to offset estimator 66, which provides an initial or coarse frequency offset signal to automatic frequency correction unit 58.

Deinterleaver 36 performs the reverse function employed by interburst interleaving circuit 24 of FIG. 3. The output terminal of deinterleaver 36 is coupled to a block deinterleaver 38, which performs the reverse function employed by block diagonal interleaving circuit 22. Thus the output signal of block deinterleaver 38 may appear substantially similar to signal bursts illustrated in FIG. 4. One output terminal of block deinterleaver 38 is coupled to a comparator 56. The other output terminal of block deinterleaver 38 is coupled to the input terminal of a departitioning circuit 40, which performs the reverse function employed by departitioning circuit 20 of FIG. 3. The output terminal of departitioning circuit is coupled to the input terminal of a channel decoder 42, which performs the reverse function employed by convolutional coder 18 of FIG. 3. In this context, channel decoder 42 comprises a Viterbi decoder. The operation of Viterbi decoder is described in more detail below. An output terminal of channel decoder 42 is coupled to a channel encoder 44, which is configured to encode the signals received from the channel decoder.

Channel encoder 44 comprises a convolutional coder 46 that performs substantially the same as convolutional coder 18 of FIG. 3. The output terminal of convolutional coder 46 is coupled to the input terminal of a partitioning circuit 48 that performs substantially the same as partitioning circuit 20. The output terminal of a partitioning circuit 48 is coupled to the input terminal of a block diagonal interleaving circuit 50, which operates substantially the same as block diagonal interleaving circuit 22 of FIG. 3. The output signal of block diagonal interleaving 50 is coupled to another input terminal of comparator 56. The output signal of comparator 56 is coupled to an input terminal of adaptive frequency correction unit 58. This output signal is referred to as sub-frame bit error quality indication signal or channel quality indication signal, RXQUAL.

The output signal of channel decoder 42 is also coupled to the input terminal of an ordering and tailing circuit 70 which performs the reverse function of circuit 16 of FIG. 3, and provides a signal to an input terminal of a cyclic decoder 72. The cyclic decoder performs the reverse function employed by cyclic coder 14 of FIG. 3. Finally, the output signal of cyclic decoder 72 is coupled to an input terminal of a speech decoder 74, which performs the reverse function employed by speech encoder 12 of FIG. 3.

The operation of receiver 28 in accordance with the present invention is described hereinafter. As mentioned before, due to ambient temperature variations, it is necessary to adjust the frequency offset error between the transmitter and the receiver stations to substantially reduce communication errors. Adaptive frequency correction unit 58 is responsible for acquiring and tracking the relative frequency or phase offset between signals shifted in response to automatic frequency correction rotation sub-unit 32 and signals transmitted by a transmitter employing signal processor 10. The adaptive frequency correction unit then provides a feedback signal to adaptive frequency correction rotation subunit 32. This feedback signal represents a rotation frequency offset signal, AFC_F_rotor, calculated by the adaptive frequency correction unit. In response to this feedback signal, adaptive frequency correction rotation sub-unit 32 rotates the phase of incoming signals in accordance with the rotation frequency offset signal AFC_F_rotor, so as to adjust their phase and substantially reduce communication errors.

Adaptive frequency correction unit 58 employs an adaptive update and tracking algorithm, as will be explained in more detail below, to update and track the relative frequency offset between the signals transmitted and the signals received by receiver 28. This relative frequency offset is measured based on the signals coupled to input terminals of adaptive frequency correction unit 58. These signals may include: (1) an initial or coarse frequency offset estimate signal, which is the frequency or phase delay acquired by synchronizer 52, for signals received by receiver 28. This initial estimate is only a coarse estimate of frequency offset or phase delay between the signals transmitted and signals received by receiver 28; (2) an instantaneous residual frequency or phase offset signal, AFC_F_res, acquired by equalizer 34, which provides a more accurate estimate of this frequency offset or phase delay; a burst accumulated cost signal, Burst_Qual, which represents the equalizer quality, as will be explained in more detail below; and the sub-frame bit error quality indication signal, also referred to as channel quality indication signal, RXQUAL, provided by comparator 56.

Equalizer 34 continuously provides the residual frequency offset signal, AFC_F_res, to automatic frequency correction unit 58. This residual frequency offset signal, AFC_F_res, may be used by adaptive frequency correction unit 58 if it is qualified as acceptable based on the burst accumulated cost signal, Burst_Qual, provided by equalizer 34, and based on the sub-frame bit error quality indication signal, or channel quality indication signal, RXQUAL, provided by comparator 56. Adaptive frequency correction unit 58 also measures a reference frequency offset, AFC_F_ref accumulating residual frequency offset signals, AFC_F_res derived from a predetermined number of acceptable burst signals, as indicated by quality indication signal, RXQUAL, to obtain an accumulated residual frequency offset signal AFC_F_acc, and dividing the AFC_F_acc signal over the number of residual frequency signals AFC_F_res accumulated.

The sub-frame bit error quality indication signal, or channel quality indication signal, RXQUAL, is explained in more detail herein. As previously explained, the signals at the output of deinterleaver 36 follow the same structure as illustrated in FIG. 4. Thus each signal burst at the output terminal of deinterleaver 36 comprises a partial sequence of data from one speech frame n, and a partial sequence of data from another speech frame n−1. However, since equalizer 34 decodes the incoming signals based on an estimate of these signals, there may be a certain number of bit errors in the output signal of deinterleaver 36. After these signals have traveled through block deinterleaver 38, departitioning unit 40, and channel decoder 42, these bit errors are substantially eliminated. Channel encoder 44 again reconstructs the signals following the same structure illustrated in FIG. 4. The output signal of channel encoder 44 is substantially free of error. This output signal is compared with the output signal of deinterleaver 36. It will, of course, be appreciated that when signal processor 10 of FIG. 3 lacks an interleaver 24, the output signal of channel encoder 44 is compared with the output signal of equalizer 34.

The channel quality indication signal RXQUAL corresponds to the number of mismatches in the bits received from channel encoder 44 and deinterleaver 36, or alternatively equalizer 34. RXQUAL(n) signal, is declared acceptable by automatic frequency correction unit 58, if the bit error count over a speech frame is below a predetermined threshold.

In accordance with one embodiment of the invention, if the RXQUAL signal indicates a bad speech frame, all eight burst signals associated with that speech frame may be considered unacceptable. In that event, automatic frequency correction unit 58 would discard the residual frequency offset signals, AFC_F_res, obtained from equalizer 34, corresponding to these burst signals.

In accordance with another embodiment of the invention, if, for example RXQUAL(n−1) indicates a good frame detection, but RXQUAL(n) indicates a bad frame detection, it may be assumed that sub-blocks $B''_0$, $B''_1$ $B''_2$, $B''_3$ are possibly acceptable, while sub-blocks $B''_4$, $B''_5$ $B''_6$, $B''_7$, are in error. As a result residual frequency error acquired over bursts 4 through 7 may be discarded by automatic frequency correction unit 58, while residual frequency error signal acquired over bursts 0 through 3 may be used, provided that the remaining conditions mentioned above are met. This embodiment of the invention provides a more simple approach to measure the received burst quality for each speech frame.

Synchronizer 52 provides a coarse frequency offset error or phase delay signal, AFC_F_synch, at predetermined intervals, which is an estimate of the frequency offset between the frequency of the local oscillator and that of the transmitted signals. The operation of synchronizer 52 is explained in more detail hereinafter. In one embodiment of the present invention synchronizer 52 is substantially similar to a synchronizer described in the co-pending U.S. patent application Ser. No. 08/357,003, entitled" Oscillator Frequency Offset Error Estimator For a Wireless Communication System, Such As For Use With GSM," (Mobin 25), by M.S. Mobin, filed Dec. 16, 1996, abandoned Jul. 3, 1996 and refiled on Jul. 3, 1996, Ser. No. 08/674,929 and incorporated herein by reference. Synchronizer 52 responds to a series of predetermined binary bits such as zero's, known as frequency correction bits "FCB's". These FCB bits are transmitted by a transmitter at predetermined intervals. Phase derotator 64 applies a 90° phase shift to each differentially encoded symbol or signal sample in the signal burst transmitted via the wireless medium. For example, each signal sample is multiplied by $$e^{j\frac{\pi}{2}k},$$

where k=0,1,2,3 . . . . Of course, the invention is not restricted in scope to a signaling scheme employing a particular direction of rotation or derotation.

The output signal of phase derotator 64 is coupled to a phase offset error estimator 66, which is used to determine the phase offset error as a result of a difference in frequency between the modulating frequency of the transmitted signal and the frequency of the crystal oscillator within downconverter 30.

Figure 5A:
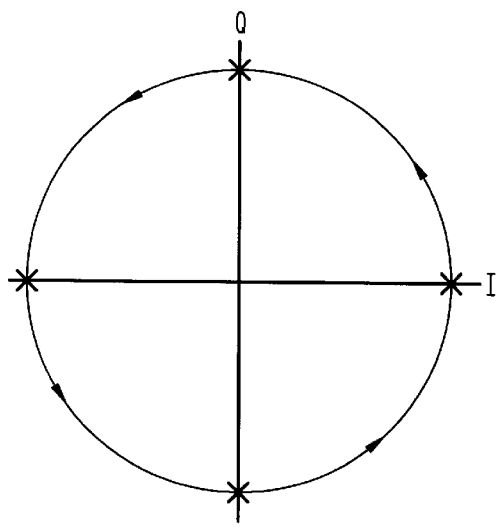
FIGS. 5a through 5c are plots of complex signals in the Inphase-Quadraturephase(I-Q) plane illustrating signal constellations with and without frequency offset errors.
Figure 5B:
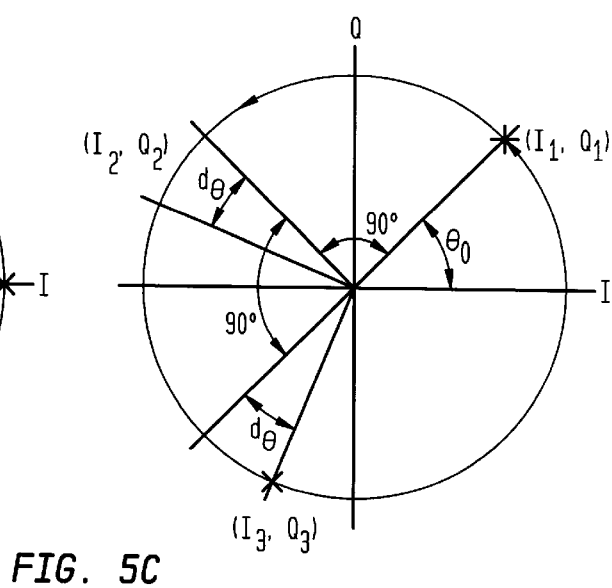
Figure 5C:
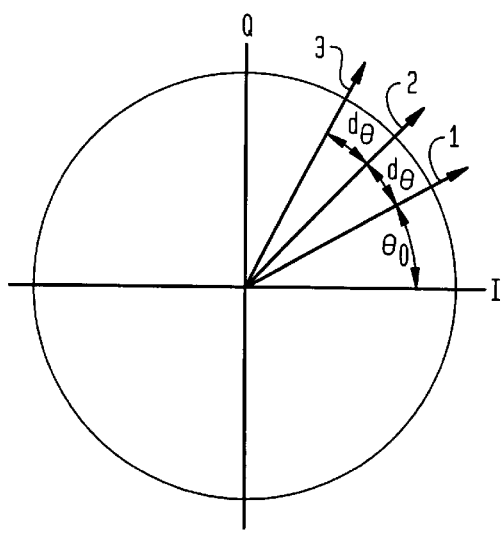

The operation of frequency offset error estimator according to one embodiment of the invention is described in reference to FIGS. 5a through 5c. As mentioned, signal processor 10 of FIG. 2, periodically sends a set of binary "zero" frequency correction bits, FCB's, that are used to calculate the frequency or phase offset error generated at the receiver.

FIG. 5a illustrates an idealized signal constellation in the I-Q plane of a frequency burst of "zero" signals that have been encoded in accordance with GSM GMSK specified modulation. At receiver 28, after down conversion, each differentially encoded bit value produces a phase shift in the I-Q plane of 90°, as illustrated in FIG. 5a. This corresponds to a counter-clockwise rotation in the I-Q plane for a stream of binary digital signal "zeros" being transmitted.

FIG. 5b illustrates the effect of the frequency offset error on the signal constellation in the I-Q plane of the same frequency burst of "zero" signals that have been encoded in accordance with GSM GMSK specified modulation. As illustrated, a first baseband signal, denoted ($I_1$, $Q_1$) in rectangular coordinates, is obtained. An initial offset error, $\Theta_0$, may be imparted to the incoming signals. The next signal, which is also a zero, should have a counter-clockwise rotation of 90°. However, due to the resultant offset error, the resulting signal $I_2,Q_2$ is oriented at dΘ plus 90° with respect to $I_1$, $Q_1$. Similarly the resulting signal $I_3$, $Q_3$ of the following zero is oriented at dΘ plus 90° with respect to $I_2$, $Q_2$ and so forth, where dΘ is the additional phase offset due to frequency offset error, of one signal to the other.

According to one embodiment of the invention, phase derotator 64 is used to derotate the phase of incoming baseband signals by −kπ/2 radians, such that the incoming signals of "zeros" are all desirably shifted to a fixed point on the constellation, such as the "+1" location in the I-Q plane. FIG. 5c illustrates the result of this derotation. Due to the frequency offset error, each incoming signal after derotation falls within dΘ of the previous signal. Frequency offset error estimator 66 measures the dΘ between consecutive incoming "zeros" and calculates the average value of δ=ΣdΘ/n over a predetermined sequence of "n" incoming "zeros." The resulting average value δ is a course estimate of the course frequency offset signal, AFC_F_synch.

Equalizer 34 is explained in more detail hereinafter with reference to FIG. 6. Equalizer 34 includes a Viterbi decoder 114, used to receive and decode input signals from AFC rotation sub-unit 32 (FIG. 1). In one embodiment of the present invention, equalizer 34 may be implemented using a digital signal processor DSP1618 available from Lucent Technologies Inc., which includes an embedded error correction coprocessor (ECCP) for operating as Viterbi decoder 114, described in the preliminary data sheet, dated February 1994, available from Lucent Technologies Inc. or AT&T Corp., herein incorporated by reference, although the scope of the invention is not limited in this respect.

Equalizer 34 also includes a channel estimator 116 used to measure an estimate of the characteristics of the communications channel through which the signals are being transmitted. The output terminal of the channel estimator 116 is coupled to Viterbi decoder 114 and to a signal reconstructor 118. Viterbi decoder 114 produces two output signals, one of which provides a long version of decoded output signal to a decoded output register 129. The other output signal of the Viterbi decoder provides a short decoded output signal to a short decoded output register 132, also coupled to signal reconstructor 118. The output terminal of the signal reconstructor is coupled to a multiplier 120, which also receives an input signal from AFC rotation sub-unit 32 through a delay register 122. Multiplier 120 performs a complex conjugate multiplication and provides an output signal fed into a residual frequency offset register 124. The output signal provided by register 124 represents the phase difference between the input signal sample provided to the equalizer and an estimated signal sample derived from the equalizer. The output signal of residual frequency offset register 124 is in turn coupled to automatic frequency correction unit 58.

The operation of the Viterbi decoder 114 in conjunction with channel estimator 116 is described in the aforementioned U.S. Pat. No. 5,465,275, patented Nov. 7, 1995 entitled "Efficient Utilization of Present State/Next State Registers," filed Nov. 16, 1993, by D D. Blaker, M. Diamondstein, G. Ellard, M. Mobin, H. Sam and M. Thierbach (Blaker 3-2-3-3-4-10) and U.S. Pat. No. 5,592,514, entitled "Method Of Performing Signal Reconstruction At the Receiving End of a Communications System, Such As For GSM," (Mobin 20) by M. S. Mobin filed Mar. 8, 1995, and incorporated herein by reference, although the invention is not limited in scope to this embodiment. Viterbi decoder 114 is a maximum likelihood decoder that provides forward error correction. The Viterbi decoder works back through a sequence of possible bit sequences at each symbol instant to determine which one bit sequence is most likely to have been transmitted. The possible transitions from a bit at one symbol instant, or state, to a bit at a subsequent, symbol instant or state is limited. Each possible transition from one state to a next state may be illustrated graphically and is referred as a branch in this context. A sequence of interconnected branches is referred to as a path in this context. Each state may transition only to a limited number of next states upon receipt of the next bit (or set of bits) in the bit stream. Thus, potential paths remain while other potential paths are eliminated during the decoding process. By eliminating those paths that are not permissible, computational efficiency may be achieved in determining the most likely paths to have been transmitted.

Channel estimator 116 uses the training bits of an incoming burst as illustrated in FIG. 2, to calculate an estimate of the channel over which the transmission occurred. This channel estimate is the impulse response function of the communication channel through which the bursts are being transmitted from a transmitter station to a receiver station, such as receiver 28. The received signal is distorted due to noise and inter symbol interference associated with transmission via the communications channel. By cross-correlating received training bits with a reference sequence of bits, an estimate of the channel is obtained. Each term in the impulse function is a complex quantity and is referred to in this context as a tap weight or channel tap. Each tap weight represents the effects of channel distortion on the transmitted signal.

In this embodiment, Viterbi decoder 114 receives the tap weights generated by channel estimator 116. It then convolves these tap weights with all possible combinations of Viterbi states to obtain a reconstructed signal for each state. The Viterbi states represent all possible next states in the transmission. The convolution is achieved by convolving all $2^C$ possible states, representing the Viterbi states with the channel tap estimates, to obtain an estimate of the received signal for each candidate state that is employed in a process referred to in this context as branch metric processing.

The Viterbi decoder typically processes a branch metric associated with each branch transition and employs this branch metric to determine the remaining paths as previously described. A branch metric is processed at each symbol instant for each possible transition from one individual state to the next individual state according to $$BM = (I-I')^2 + (Q-Q')^2 = \text{Euclidean Distance}$$

where BM is the branch metric quantity, I, Q are the components of each reconstructed signal sample and I' Q' are the components of the received signal sample. Various methods for obtaining branch metrics are known in the art, and the invention is not limited in scope to a particular technique.

The branch metric of both branches transitioning to a given next individual state are processed, then added to the accumulated cost of the respective originating individual state, resulting in two potential accumulated cost sums. A comparison is made of the two potential accumulated cost sums. The lesser of the two sums is selected as the next state accumulated cost as follows:

$$UACE(n) = \min(PSAC(n)+BM(n), PSAC(n+1)+BM(n+1))$$

where UACE(n) is the updated accumulated cost estimate of Viterbi state n, PSAC(n) is the present accumulated cost estimate of Viterbi state n and BM(n) is the branch metric for Viterbi state n. The transition corresponding to the lesser sum is the more likely transition from the two possible originating individual states to the given next individual state. The originating individual state of the more likely transition is stored as the surviving origin of a branch to the given next individual state. The lesser sum is the accumulated cost of the next individual state and replaces the accumulated cost for that individual state. This process is repeated for each of the next individual states and repeated also for each symbol instant until all symbols in the bit stream of one signal burst are decoded. The updated Viterbi state cost for each transmission of a signal burst is an indication of the amount of bit error rate of the Viterbi decoder. This final updated state cost may be represented by the Burst_Qual signal described above.

The Burst_Qual signal may be compared with a predetermined threshold. If the updated state cost is above this threshold, the number of errors corrected by the Viterbi decoder is considered to be an unacceptable rate. In response, the Viterbi decoder provides an unacceptable equalizer quality signal indication via equalizer quality line 130 (FIG. 1). If, on the other hand, the updated state cost is below the predetermined threshold, the number of corrected errors by the Viterbi decoder falls within an acceptable range. The Viterbi decoder provides an acceptable equalizer quality signal indication over equalizer quality line 130. Therefore, for each received burst, the equalizer quality may be determined. Likewise, equalizer quality may also be determined by decoding a sequence of bits shorter than a transmitted signal burst or larger than a transmitted signal burst. The automatic frequency correction unit receives an indication of the equalizer quality over equalizer quality line 130.

Figure 6:
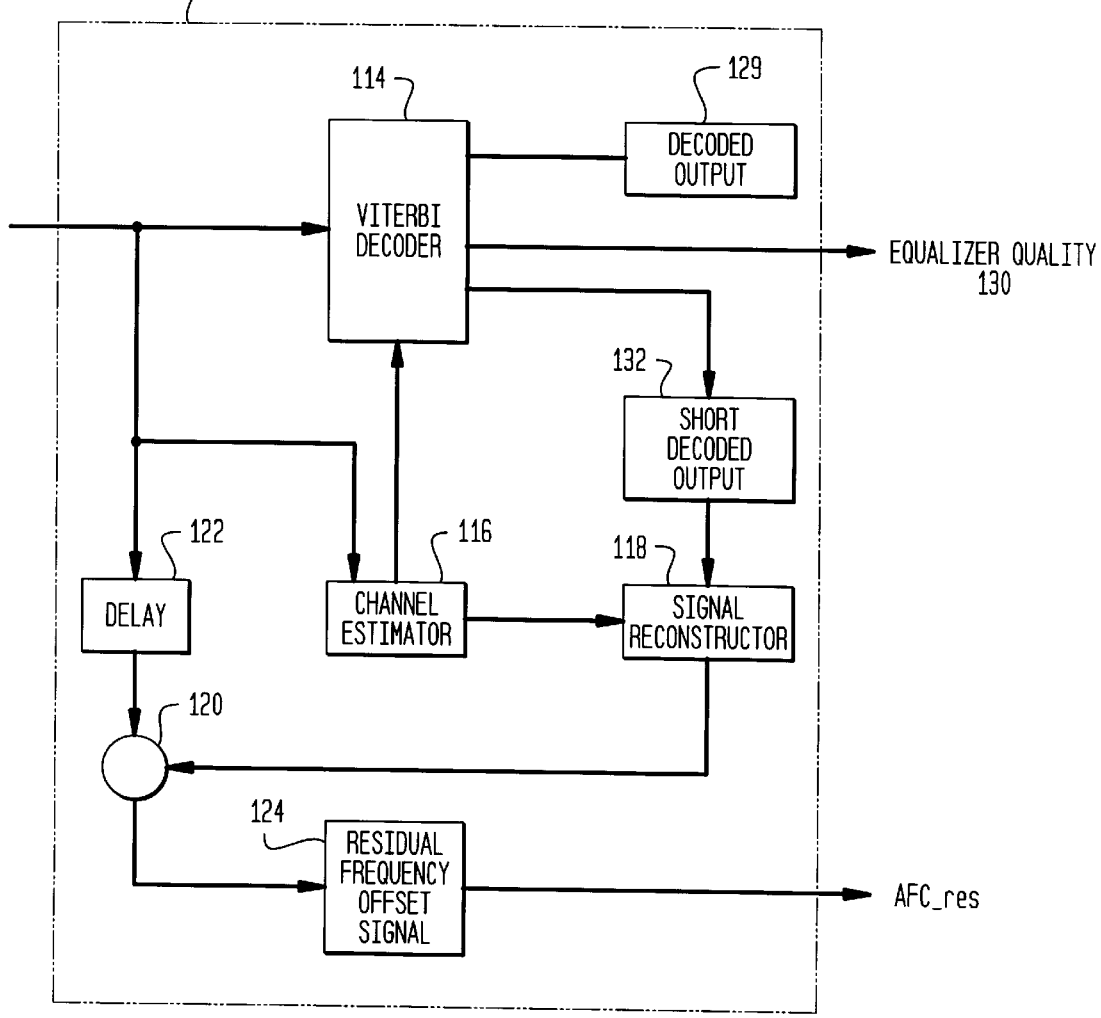
FIG. 6 is a block diagram of an equalizer in accordance with the embodiment of the present invention.

The operation of signal reconstructor 118 is described in more detail in reference with FIG. 6. The output signal of Viterbi decoder 114 is fed to a short decoded output register 132. This register provides a decoded signal to signal reconstructor 118. The signal reconstructor retrieves the estimated channel taps generated by channel estimator 116. It then reencodes the decoded signal it received from the Viterbi decoder, by convolving the channel taps with the decoded signal. The result of this convolution is an estimated reconstructed signal.

As mentioned, the output signal of signal reconstructor 118 is subjected at a multiplier 120 to a complex conjugate multiplication with the original received signal coming through the delay register 122. The output signal of multiplier 120 is the residual frequency offset error signal AFC_F_res, which is stored in the residual frequency offset register 124. It will be appreciated that the Doppler offset error due to the errors caused by Doppler shift may also be stored in register 124. In one embodiment of the invention, the Doppler phase offset error is derived according to the description in patent application Ser. No. 08/401,058, entitled "Method of Compensating For Doppler Error In a Wireless Communications System, Such As for GSM And IS54," (Mobin 18) by M. S. Mobin, filed Mar. 8, 1995, and incorporated herein by reference, although this invention is not limited in scope to this implementation of Doppler error estimation, or Doppler error estimation in general.

Figure 1B:
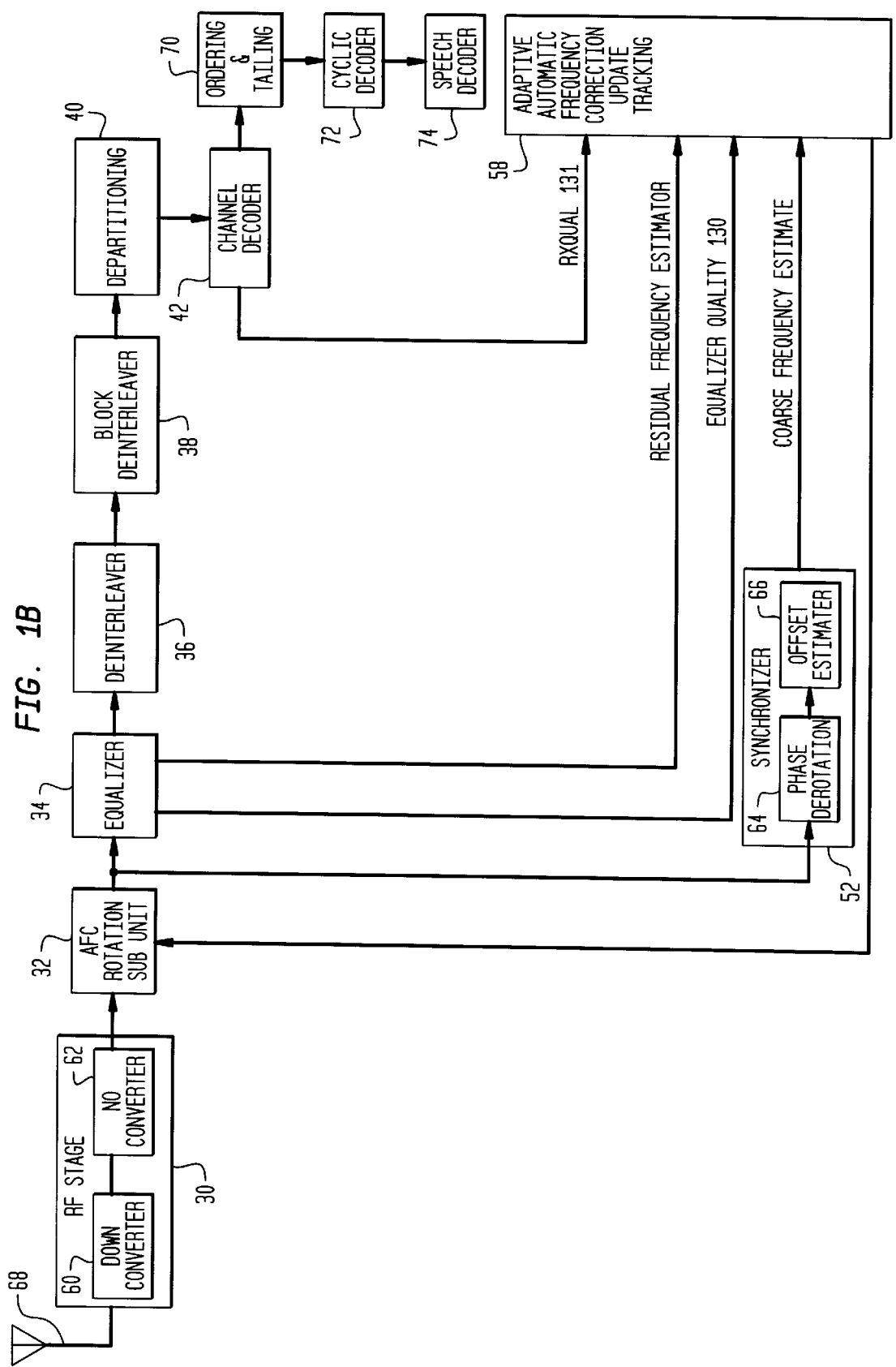
FIG. 1b is a block diagram illustrating another embodiment of a system employing adaptive frequency correction in accordance with the present invention.

FIG. 1*b* illustrates another embodiment of receiver 28 in accordance with the present invention. In this embodiment, receiver 28 does not employ a channel reencoder 44. Instead an output signal of the Viterbi decoder in channel decoder 42 is directly coupled to an input terminal of automatic frequency correction unit 58, via line 131. This output signal of Viterbi decoder may be configured so as to represent the accumulated cost over four consecutive signal bursts received from departitioning unit 40. The operation of Viterbi decoder 42 is substantially the same as the operation of Viterbi decoder 114 explained in FIG. 1*a*. However, whereas Viterbi decoder 114 measures the accumulated cost for one signal burst, Viterbi decoder of channel decoder 42 measures the updated Viterbi state cost for four signal bursts although the invention is not limited in scope in that respect. For this embodiment, sub-frame bit error, RXQUAL (n) comprises the updated state cost over four received signal bursts from one speech frame, and the final updated state cost over four received signal burst over the next speech frame.

For each four bursts, this updated state cost, RXQUAL signal is compared with a predetermined threshold. If the updated state cost is above this threshold, the number of errors made by the Viterbi decoder is considered to be above an acceptable rate. In response, the Viterbi decoder provides an unacceptable RXQUAL signal indication via RXQUAL quality line 131. If, on the other hand, the updated state cost is below the predetermined threshold, the number of corrected errors by the Viterbi decoder falls within an acceptable range. The Viterbi decoder provides an acceptable RXQUAL quality signal indication over RXQUAL quality line 131. Thus, Viterbi decoder of channel decoder 42 provides a signal that corresponds to a sub-frame bit error rate.

FIG. 7 is a flowchart depicting a pseudo code sequence of the operation of the automatic frequency correction unit 58 employed in this particular embodiment of the present invention. The system at step 200 initializes the automatic frequency correction unit 58. Frequency correction unit 58 operates in two modes: training or transient mode and tracking or steady state mode. When a receiving station is first turned on or when it is reset, the initialization step 200 begins, while the frequency correction unit 58 is in the training mode. At this step automatic frequency correction unit 58 sends the latest frequency offset signal, AFC_F_synch, determined by synchronizer 52 to AFC rotation sub-unit 32. Thus, automatic frequency correction rotation sub-unit 32 generates a rotation frequency offset signal AFC_F_rotor, substantially equal to frequency offset signal, AFC_F_synch. Rotation frequency offset signal AFC_F_rotor is used to rotate the incoming down-converted signals so as to adjust their phase.

At step 202, automatic frequency correction unit 58 sets the average residual frequency offset signal, AFC_F_ref to zero. It also sets a counter accumulation Count to zero. At step 204, automatic frequency correction unit 58 initializes accumulated residual frequency offset signal to zero. At step 206, automatic frequency correction unit 58 accumulates residual frequency offset signals, AFC_F_res, obtained from equalizer 34 over four bursts.

At step 208, automatic frequency correction unit 58 evaluates RXQUAL signal. If RXQUAL signal indication is acceptable, the accumulated frequency offset signal AFC_F_acc is accumulated with the value derived at step 206. At the same time the counter accumulation Count signal is incremented by four.

At step 210, automatic frequency correction unit 58 continues residual frequency offset accumulation, as explained in steps 204, 206 and 208, until the counter accumulation Count signal has reached a predetermined threshold, such as 4*N1, where N1 is a predetermined number.

At step 212, automatic frequency correction unit 58 calculates the average residual frequency offset signal, AFC_F_ref by dividing accumulated residual frequency signal, AFC_F_acc over 4*N1, and sets counter accumulation Count signal to zero.

At step 214, automatic frequency correction unit 58 enters its steady state. It sets the accumulated residual frequency offset signal, AFC_F_acc to zero. At step 216, unit 58, determines an accumulated residual frequency offset signal by accumulating residual frequency offset signals, AFC_F_res, over four bursts, if the Burst_Qual signal derived from equalizer 34 is below a given threshold, and each residual frequency offset signal is smaller than the average residual frequency offset signals, AFC_F_ref.

At step 218, automatic frequency correction unit 58, accepts the accumulated residual frequency offset signal, derived at step 216, if RXQUAL signal indication is acceptable. Unit 58 also increments the counter Count by four. Otherwise, unit 58, discards the accumulated residual frequency offset signal, derived at step 216. At step 220, unit 58 repeats steps 216 and 218, until, counter Count reaches a predetermined number 4*N2, where N2 is a given number.

At step 222, rotation frequency offset signal AFC_F_rotor is updated by an average frequency signal AFC_F_acc, derived from steps 216 through 220. At step 224, unit 58 continues AFC tracking by returning to step 202, if automatic frequency correction unit is enabled. Otherwise, Unit 58 goes to an idle state at step 226.

At step 226, if AFC is enabled, it returns to step 202. Otherwise, it resets AFC_F_acc count to zero and goes to step 228.

Steps 228 to 232 are referred to as a warm-start procedure. During these steps, unit 58 emerges out of the idle state and enters a steady state cycle. At step 228, unit 58, measures the accumulated residual frequency offset signals, by adding residual frequency offset signals obtained from equalizer 34. At step 230, if RXQUAL signal is acceptable, unit 58 considers this accumulated residual frequency offset signal and increments the counter Count by 4. At step 232, unit 58 continues steps 228 and 230, as long as the number of received signal bursts is within a predetermined threshold. Otherwise, unit 58 goes to its idle state 226. Thereafter, if automatic frequency correction is enabled, Unit 58 goes to step 202 again for reinitialization.

It can be appreciated by those skilled in the art that the above system can be implemented so that the automatic frequency correction unit also measures the remaining frequency offset error imposed by a Doppler shift. Thus the remaining offset frequency register 124 would include the frequency offset error due to both Doppler shift and crystal oscillation offset between the transmitter and the receiver.

It will now be appreciated that an automatic frequency correction unit according to the present invention provides a more accurate estimate of phase offset error than those provided by prior art systems. Furthermore, channel quality and equalizer quality estimation provide an effective criteria to evaluate the reception quality of the receiver, allowing for an effective phase offset correction.

While only certain features of the invention have been illustrated and described herein, many modifications, substitutions, changes or equivalents will now occur to those skilled in the art. It is therefore, to be understood that the appended claims are intended to cover all such modifications and changes as fall within the true spirit of the invention.

We claim:

1. A method for reducing frequency offset errors in a communications system, said method comprising the steps of:
   receiving a plurality of signal bursts, each signal burst containing a plurality of signals;
   decoding said plurality of received signal bursts by employing an equalizer;
   generating a plurality of burst quality indication signals each burst quality indication signal corresponding to the bit error rate in each of said plurality of received signal bursts;
   generating a plurality of residual frequency offset signals, each of said plurality of generated residual frequency offset signals corresponding to one of said plurality of received signal bursts;
   accumulating said plurality of residual frequency offset signals having acceptable burst quality indication signals;
   acquiring a rotation frequency offset signal based on said plurality of accumulated residual frequency offset signals; and
   adjusting the phase of each of said plurality of signals in said plurality of received signal bursts in accordance with said rotation frequency offset signal.

2. A method for reducing frequency offset errors in a communications system, said method comprising the steps of:
   receiving a plurality of signal bursts, each signal burst containing a plurality of signals;
   performing a channel estimation based on predetermined signal information contained in said plurality of signal bursts;
   decoding said plurality of received signal bursts by employing a first Viterbi decoder in accordance with said channel estimation to produce first Viterbi decoded signals; and
   generating a burst quality indication signal in accordance with updated cost generated by said first Viterbi decoder for decoding a signal burst;
   generating a plurality of residual frequency offset signals, each of said plurality of generated residual frequency offset signals corresponding to one of said plurality of received signal bursts;
   accumulating a plurality of residual frequency offset signals having acceptable burst quality indication signals;
   acquiring a rotation frequency offset signal based on said plurality of accumulated residual frequency offset signals; and
   adjusting the phase of each of said plurality of signals in said plurality of received signal bursts in accordance with said rotation frequency offset signal.

3. The method of claim 2, wherein said step of generating a plurality of residual frequency offset signals further comprises the steps of:
   re-encoding said first Viterbi decoded signals in accordance with said channel estimation so as to provided re-encoded signals;
   multiplying said plurality of re-encoded signals with signals provided to said equalizer to generate said plurality of residual frequency offset signals.

4. The method of claim 3 further comprising the steps of:
   channel decoding a block of said first Viterbi decoded signals;
   channel reencoding said block that was channel decoded of said first Viterbi decoded signals; and
   comparing said block that was channel reencoded with said first Viterbi decoded signals so as to generate a channel quality indication signal.

5. The method of claim 4 further comprising a training mode and a tracking mode, said training mode further comprises the steps of:
   determining a course frequency offset signal by employing a synchronizer, in response to a plurality of predetermined known signals;
   accumulating said plurality of residual frequency offset signals over a predetermined number of received synchronization bursts;
   said tracking mode further comprising the steps of:
      measuring the average value of a plurality of accumulated residual frequency offset signals based on said accumulating step to obtain an average value;
      accumulating residual frequency offset signals over a plurality of burst signals, only when said burst quality indication signal is smaller than a first predetermined threshold value, and a plurality of channel quality signals is smaller than a second predetermined threshold value and said average value is less than a third predetermined threshold value; and
      updating said rotation frequency offset signal in accordance with said plurality of accumulated residual frequency offset signals.

6. The method of claim 5 wherein said method further comprises the step of determining an initial frequency offset signal, said determining step further comprising the steps of:

derotating a plurality of predetermined received signals to produce derotated signals;

determining plurality of phase differences between consecutive derotated signals; and calculating the average value of the phase differences over the plurality to obtain said initial frequency offset signal.

7. The method according to claim 6, wherein said plurality of predetermined received signals comprise "zero" bits.

8. A method for reducing frequency offset errors in a communications system, said method comprising the steps of:

receiving a plurality of signal bursts corresponding to a plurality of transmitted signal bursts;

decoding a plurality of received signal bursts by employing an equalizer so as to generate decoded signal bursts, said equalizer further generating a burst quality indication signal corresponding to the bit error rate in each received signal burst;

channel decoding said decoded signal bursts by employing a first Viterbi decoder, and generating a channel quality indication signal corresponding to the bit error rate in a plurality of said signal bursts;

generating a plurality of residual frequency offset signals;

accumulating residual frequency offset signals corresponding to signal bursts having acceptable burst quality indication signals, and acceptable channel quality indication signals;

acquiring a rotation frequency offset signal based on a plurality of accumulated residual frequency offset signals; and adjusting the phase of said plurality of received signal bursts in accordance with said rotation frequency offset signal.

9. The method according to claim 8, wherein said decoding step further comprises the steps of:

performing a channel estimation based on predetermined signal information contained in said plurality of transmitted signal bursts;

Viterbi decoding said plurality of received signal bursts by employing a second Viterbi decoder in accordance with said channel estimation to produce decoded signal bursts; and generating a burst quality signal in accordance with updated cost generated by said second Viterbi decoder for decoding a signal burst.

10. The method according to claim 9, further comprising a training mode and a tracking mode, said training mode further comprises the steps of:

determining an initial frequency offset signal by employing a synchronizer, in response to a plurality of predetermined known signals;

updating said rotation frequency offset signal in accordance with said initial frequency offset signal;

accumulating said residual frequency offset signals over a predetermined number of received signals, when said channel quality indication signal is within an acceptable predetermined value;

said tracking mode further comprising the steps of:

measuring an average value of a plurality of accumulated residual frequency offset signals;

accumulating residual frequency offset signals over a plurality of burst signals, when a burst quality signal is smaller than a first predetermined threshold value, and said channel quality indication signal is smaller than a second predetermined threshold value and said average value is less than a third predetermined threshold value; and updating said rotation frequency offset signal in accordance with a plurality of accumulated residual frequency offset signals.

11. The method of claim 10 wherein said step of determining an initial frequency offset signal further comprises the steps of:

derotating a plurality of predetermined received signals to produce derotated signals;

determining plurality of phase differences between consecutive derotated signals; and calculating the average value of the phase differences to obtain said initial frequency offset signal.

12. The method according to claim 11, wherein said plurality of predetermined received signals comprise "zero" bits.

13. The method according to claim 10 further comprising a warm start cycle comprising the steps of accumulating said residual frequency offset signals when said channel quality signal is within an acceptable value, and the number of received signal bursts is within a predetermined value.

14. An integrated circuit at the receiving end of a communications system for receiving signal bursts, comprising:

a frequency derotator for adjusting the phase of signal bursts received by said communications system;

an equalizer for decoding said signal bursts received by said communications system, said equalizer generating a decoded version of said signal bursts, a burst quality signal indication and a residual frequency offset signal;

a channel decoder for further decoding said decoded version of said signal bursts so as to generate signal bursts having substantially eliminated bit errors;

a channel reencoder for encoding said signal bursts generated by said channel decoder;

a comparator for comparing a plurality of the output signals generated by said channel reencoder with signals generated by said equalizer so as to generate a channel quality indication signal; and a frequency correction unit configured so as to receive said residual frequency offset signals, said burst quality signal indication, and said channel quality signal indication so as to generate a rotation frequency offset signal, to control said frequency derotator.

15. The system in accordance with claim 14 further comprising a synchronizer having an output port coupled to said frequency correction unit, for generating an initial frequency offset signal in response to a predetermined plurality of transmitted signals.

16. The system in accordance with claim 14 wherein said initial frequency offset signal is coupled to said frequency derotator.

17. The system in accordance with claim 15, wherein said frequency correction unit further comprises measuring means to derive an average value of said residual frequency offset signals.

18. The system according to claim 16, wherein said average value is employed to determine said rotation frequency offset signal.

19. The system according to claim 17, wherein said frequency correction unit accumulates said residual frequency offset signals when said average value signal is below a given threshold, and said burst quality signal indication is within a predetermined acceptable range, said frequency correction unit further accumulates residual frequency offset signals over four burst signal bursts.

* * * * *